United States Patent
Maruyama

(10) Patent No.: US 8,451,480 B2
(45) Date of Patent: May 28, 2013

(54) IMAGE COMMUNICATION APPARATUS AND IMAGE FORMING APPARATUS INCLUDING THE SAME

(75) Inventor: Miyoko Maruyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 578 days.

(21) Appl. No.: 12/656,574

(22) Filed: Feb. 4, 2010

(65) Prior Publication Data

US 2010/0195146 A1   Aug. 5, 2010

(30) Foreign Application Priority Data

Feb. 5, 2009   (JP) .................................. 2009-024484

(51) Int. Cl.
*G06F 15/00* (2006.01)
*G06K 1/00* (2006.01)

(52) U.S. Cl.
USPC ........................... 358/1.15; 358/1.1; 358/1.13

(58) Field of Classification Search
None
See application file for complete search history.

(56) References Cited

U.S. PATENT DOCUMENTS

| 6,476,935 B1 * | 11/2002 | Fujino ........................... 358/400 |
| 7,783,017 B2 * | 8/2010 | Ohmori .................... 379/100.12 |
| 2008/0279361 A1 | 11/2008 | Takaoka et al. |

FOREIGN PATENT DOCUMENTS

| JP | 7-312685 | 11/1995 |
| JP | 2007-174191 A | 7/2007 |
| JP | 2008-193200 | 8/2008 |
| JP | 2008-283518 | 11/2008 |

* cited by examiner

*Primary Examiner* — Thierry Pham
(74) *Attorney, Agent, or Firm* — Edwards Wildman Palmer LLP; David G. Conlin; Stephen D. LeBarron

(57) ABSTRACT

A CPU of an image forming apparatus executes a program including: the step (S210) of reading address information if a single-touch call number is input (YES at S208); a step (S230, S232) of transmitting image data using a line registered in advance; and a step (S230, S232, S226) of transmitting image data using line (1) if the line (1) is input, using line (2) if the line (2) is input and using a free line otherwise, if the line is not registered in advance.

17 Claims, 12 Drawing Sheets

FIG. 4

| CALL No. | ADDRESS NAME | ADDRESS FAX No. | TRANSMISSION LINE | ... |
|---|---|---|---|---|
| 001 | COMPANY A | **--0003 | LINE (1) | ... |
| 002 | COMPANY B | **--0033 | NOT SELECTED | ... |
| 003 | COMPANY C | **--0333 | LINE (2) | ... |
| 004 | COMPANY D | **--3333 | NOT SELECTED | ... |
| ... | ... | ... | ... | ... |

FIG. 10

IF LINE IS DESIGNATED FOR
SINGLE-TOUCH ADDRESS,
DESIGNATED LINE IS GIVEN PRIORITY.
THIS SINGLE-TOUCH ADDRESS HAS
NO LINE DESIGNATION,
AND LINE CHANGE IS POSSIBLE.
IF UNCHANGED,LINE WILL BE DETERMINED
BY DEFAULT AUTO SELECTION.


IMAGE COMMUNICATION APPARATUS AND IMAGE FORMING APPARATUS INCLUDING THE SAME

CROSS-REFERENCE TO RELATED APPLICATION

This nonprovisional application claims priority under 35 U.S.C. §119(a) on Patent Application No. 2009-024484 filed in Japan on Feb. 5, 2009, the entire contents of which are hereby incorporated by reference.

BACKGROUND OF THE INVENTION

1. Field of the Invention

The present invention relates to an image communication apparatus as represented by a facsimile machine, connected to a plurality of lines and, more specifically, to an image communication apparatus that sets a communication line for transmission easily with high flexibility. The present invention also relates to an image forming apparatus including such an image communication apparatus.

2. Description of the Background Art

In a facsimile machine communicating image data, it has been a common practice to register address names and numbers as single-touch dials or abbreviated dials to simplify user operation and to prevent misdialing, and to designate an intended destination using the single-touch or abbreviated dial at the time of transmission.

By a facsimile machine shared by a large number of people (for example, a facsimile machine used in an office), many transmissions/receptions are made in a concentrated manner during work hours. Therefore, measures are taken to ease congestion. This is to prevent reception failure of important data as much as possible, when a huge amount of data is being transmitted. As one of such measures, a facsimile machine allowing connection to a plurality of lines has been proposed. In such a facsimile machine connected to a plurality of lines, it is sometimes designated at the time of transmission which of the line is to be used for transmission. For this purpose, an arrangement has been proposed, in which a line to be used for transmission is designated in advance when a single-touch dial or an abbreviated dial is registered, so as to eliminate the necessity of designating the transmission line at the time of transmission. Further, such a facsimile machine additionally allowing simultaneous transmission of one document to a plurality of addresses (broadcast transmission) has been proposed.

In relation to such facsimile machines, Japanese Patent Laying-Open No. 7-312685 (Document 1) discloses a multi-port simultaneous broadcasting facsimile machine allowing arbitrary distribution of transmission opportunities and reception opportunities. The facsimile machine is a multi-port simultaneous broadcasting facsimile machine that starts broadcast communication, using a plurality of different types of lines and a plurality of channels, to a plurality of destinations through respective lines, including: a use status monitoring unit monitoring the status of use of each line and each channel; an address holding unit having order of input of address information registered for each type of lines; and a control unit reading address information to which transmission has not yet been made with reference to the address holding unit when a line or a channel becomes or is found to be free and starting transmission.

By the facsimile machine, when not-yet-transmitted information of the same type as the type of a free line is registered in the address holding unit, it is possible to transmit the not-yet-transmitted information through the line independent from the registered order of addresses registered in the address holding unit. Therefore, efficient use of lines becomes possible, and the time necessary for simultaneous broadcast can be reduced.

Japanese Patent Laying-Open No. 2008-283518 (Document 2) discloses a communication apparatus that can further reduce the trouble of inputting address numbers. The communication apparatus has an abbreviated dialing function by which an address number can be input with smaller number of key input operations, and includes a touch-panel input unit for inputting address numbers. The apparatus is characterized in that, based on address management information registering a plurality of abbreviated dial numbers to be referred to by the abbreviated dialing function, the manner of display on an address input operation window displayed on the touch-panel input unit is controlled. Elements of information registered as the address management information include at least an address number, address name, line type and a search string, for each abbreviated dial number.

By the communication apparatus, it is possible for a less-frequent user to easily designate an address using the touch-panel input unit and for a heavy user to designate an address quickly by inputting an abbreviated number.

SUMMARY OF THE INVENTION

According to the facsimile machine disclose in Document 1 and the communication apparatus disclosed in Document 2, since a plurality of transmission lines are connected, it is possible to designate a transmission destination with the type of line used for communication designated, using a single-touch dial or an abbreviated dial, and to transmit using a free line at the time of broadcast transmission.

It is sometimes desired by a sender to transmit using a specific line. By way of example, assume that a facsimile machine is shared by different departments of an office, and the transmission cost of each department is divided in accordance with the transmission lines. In that case, if a type of line used for transmission is registered in advance in correspondence with a single-touch dial or an abbreviated dial (Document 2) and the registered line is used by another transmission/reception, transmission is impossible. In order to avoid such a situation, it may be possible to automatically select a free line for transmission if a designated line is busy (Document 1). However, the sender cannot know which line is used for transmission, as the transmission line is automatically changed. It is often the case that the sender goes back to his/her desk after setting an address and having the document read for transmission (that is, goes away from the facsimile machine). Thus, it may be difficult to know which line is used for transmission. This leads to a problem that transmission expense cannot correctly be distributed.

Therefore, an object of the present invention is to provide an image communication apparatus in which address information (address name as identifying information, address facsimile number as transmission address information) and a communication line to be used therewith are registered in advance, and even if a transmission destination is designated by a single-touch dial or an abbreviated dial, transmission can be made taking into account the status of use of communication line at the time of transmission and/or the demand of a sender (user) on the communication line to be used, as well as to provide an image forming apparatus including such a communication apparatus.

According to an aspect, the present invention provides an image communication apparatus connected to a plurality of communication lines, for transmitting image data using any of the plurality of communication lines. The image communication apparatus includes: a storage unit for storing in advance identification information for a user to identify a transmission destination, transmission destination information for specifying a transmission destination for transmitting the image data using the communication line, and line information for specifying the communication line to be used for transmission; an input unit for the user to input the identification information; a display input unit for the user to input the line information; a call unit calling the transmission destination information and the line information, based on the identification information input by the user; and a transmission unit transmitting the image data to the transmission destination based on the called transmission destination information and the line information. The transmission unit includes a unit for transmitting, if it is determined that the communication line to be used for transmission is specified by the called line information, the image data using the specified line, and a unit for transmitting, if it is determined that the communication line to be used for transmission is not specified by the called line information, the image data using a communication line input by the user at the time of transmission of the image data.

Assuming that the image communication apparatus has a facsimile function as the image data communication function. In that case, the storage unit stores in advance information related to an address of image data used relatively frequently, as a single-touch dial or an abbreviated dial. The information related to address includes identification information, transmission destination information and line information. When a user transmits image data using the facsimile function, he/she can specify the transmission destination using a single-touch dial or an abbreviated dial. In that case, if it is determined that the communication line to be used for the transmission is specified by the line information, the specified line is used, and if it is determined that the communication line to be used for transmission is not specified, a communication line input by the user at the time of image data transmission is used, for transmitting the image data. If the user has determined the communication line to be used for transmitting the image data in advance, the communication line used is determined in accordance with the user's demand, and if the communication line is not determined in advance, the communication line used is determined based on the status of transmission at the time of transmission. Specifically, it is possible to transmit taking into account the status of use of the communication line at the time of transmission as well as the user's demand on the communication line to be used (whether he/she wishes to transmit using a specific transmission line or to transmit faster regardless of the communication line used). As a result, an image communication apparatus, in which information related to the transmission destination (identification information and transmission destination information) and the communication line to be used therewith are registered in advance and even if a transmission destination is designated by a single-touch dial or an abbreviated dial, transmission can be made taking into account the status of use of communication line at the time of transmission and/or the demand of the user on the communication line to be used, can be provided.

The display input unit may be formed of a touch-panel. In that case, the display input unit may be formed to include a unit allowing input of the line information by the user pressing an input button corresponding to a display position related to the plurality of communication lines, when the image data is transmitted.

By pressing any of the indications (buttons) related to the plurality of communication lines displayed on the touch-panel, the line information can be input. Therefore, a communication line to be used for transmitting image data can be specified in a simple manner without mistake.

The image communication apparatus may be formed to further include a broadcasting unit for setting a communication line for transmitting the image data to a plurality of transmission destinations. The broadcasting unit may be formed to include: a unit for setting, if it is determined that a communication line to be used for transmission is specified by the called line information, to use the specified communication line; a unit for setting, if it is determined that a communication line to be used for transmission is not specified by the called line information, to use a communication line input by the user at the time of image data transmission; and a unit for controlling the transmission unit such that the image data is transmitted using the set communication line.

Even when one document (image data) is to be transmitted simultaneously to a plurality of transmission destinations, if it is determined that the communication line to be used has been specified in advance, the image data is transmitted using the specified line, and if it is determined that the communication line to be used has not been specified in advance, the image data is transmitted using the communication line input by the user at the time of image data transmission. Even for broadcast communication, the communication line to be used can be determined taking into account the user's demand if the user has determined the communication line to be used for image data transmission in advance, and taking into account the status at the time of transmission if the user has not determined. Specifically, it is possible to transmit taking into account the status of use of the communication line at the time of transmission as well as the user's demand on the communication line to be used (whether he/she wishes to transmit using a specific transmission line or to transmit faster regardless of the communication line used).

By way of example, the time when a communication line is input by the user is after the transmission destination information and the line information are stored in the storage unit.

After the transmission destination information is stored as the single-touch dial or abbreviated dial in the storage unit, the communication line to be used can be determined in accordance with the status of the communication line when facsimile transmission actually takes place.

Further, by way of example, the time when a communication line is input by the user is when the user requests execution of image transmission.

When the user presses a start button (when the user requests execution of image transmission), the communication line to be used for communication of the image data is input by the user. Therefore, even if the job is held as a reservation job, the communication line can be input. Even if the user is away from the image communication apparatus after he/she pressed the start button, it is unnecessary for the user to return to the image communication apparatus to input the communication line when the previous job ends and the image data is to be actually transmitted, and the process is not stopped to wait for the input of communication line during execution of the job.

Further, by way of example, the time when a communication line is input by the user is when the user designates a transmission destination of the image.

When the user designates a facsimile transmission destination (when the user designates the transmission destination of the image data), the communication line to be used for communication is input by the user. Therefore, it is possible to input the communication line when the transmission destination is designated. Even if the user is away from the image communication apparatus after he/she pressed the start button, it is unnecessary for the user to return to the image communication apparatus to input the communication line when the image data is to be actually transmitted, and the process is not stopped to wait for the input of communication line during execution of the job.

The line information may include information that the line is one not used among the plurality of communication lines.

It is possible to transmit the image data taking into account the user's demand to transmit faster regardless of which line is used among the plurality of communication lines.

The image forming apparatus in accordance with the present invention is the image forming apparatus including any of the image communication apparatuses described above.

The image communication apparatus included in the image forming apparatus is capable of transmission taking into account the status of use of the communication line at the time of transmission as well as the user's demand on the communication line to be used (whether he/she wishes to transmit using a specific transmission line or to transmit faster regardless of the communication line used). As a result, an image forming apparatus, in which information related to the transmission destination (identification information and transmission destination information) and the communication line to be used therewith are registered in advance and even if a transmission destination is designated by a single-touch dial or an abbreviated dial, transmission can be made taking into account the status of use of communication line at the time of transmission and/or the demand of the user on the communication line to be used, can be provided.

According to the image communication apparatus and the image forming apparatus including the communication apparatus, for transmitting image data such as facsimile transmission, the information related to the transmission destination (identification information and transmission destination information) and the communication line to be used therewith as the line information are registered in advance, and the transmission destination can be designated by a single-touch dial or an abbreviated dial. Even in such a situation, if the communication line to be used for communication is not specified by the line information, the image data can be transmitted taking into account the status of use of the communication line at the time of transmission and/or the user's demand as to the communication line to be used.

The foregoing and other objects, features, aspects and advantages of the present invention will become more apparent from the following detailed description of the present invention when taken in conjunction with the accompanying drawings.

BRIEF DESCRIPTION OF THE DRAWING

FIG. 4 shows a single-touch designation table stored in image forming apparatus 150 shown in FIG. 1.

FIGS. 7 to 11 show examples of images displayed on a display panel 172 shown in FIG. 3.

DESCRIPTION OF THE PREFERRED EMBODIMENTS

Figure 1:
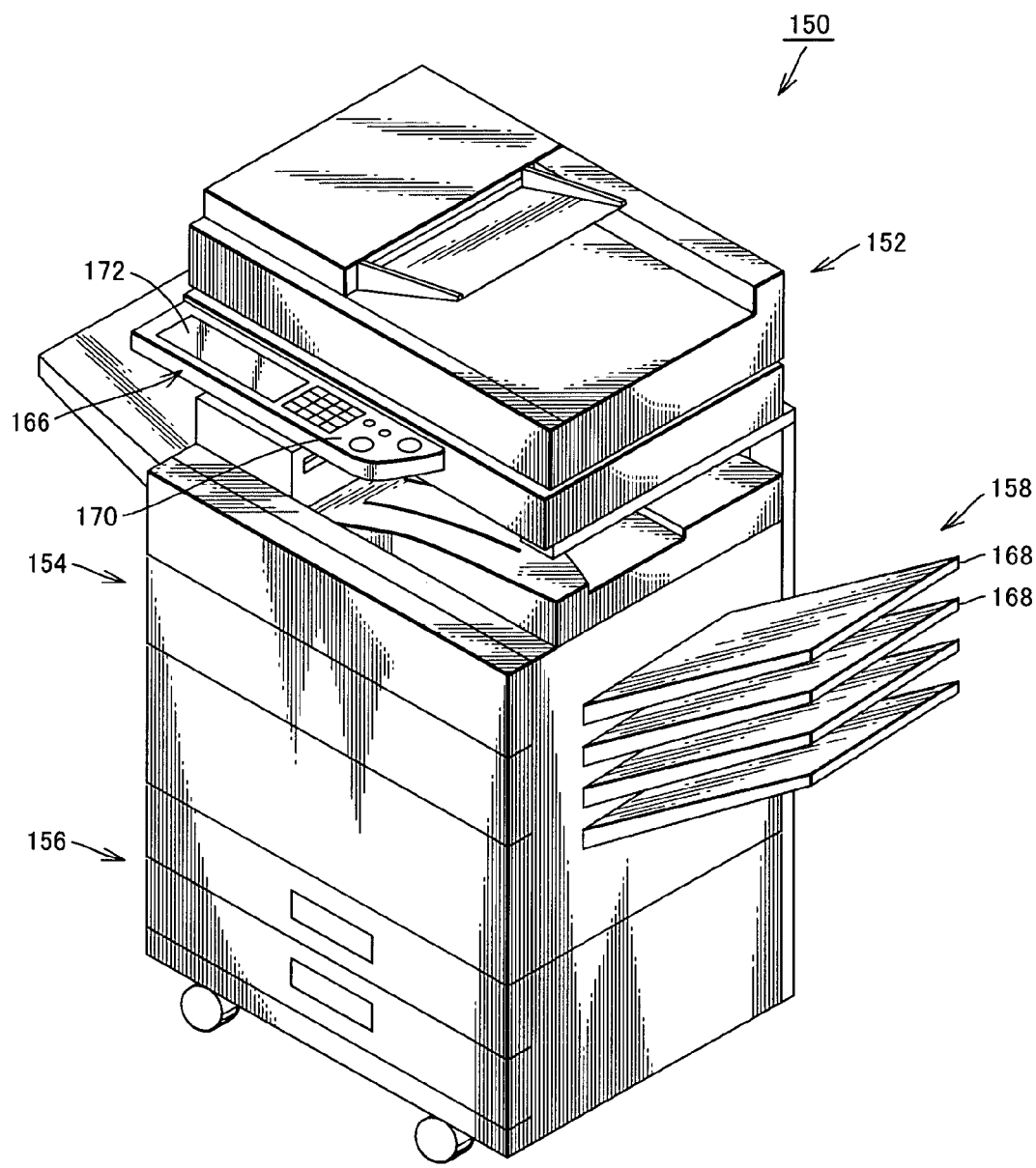
FIG. 1 is a perspective view showing an appearance of an image forming apparatus 150 in accordance with a first embodiment of the present invention.

In the following embodiments, the same components are denoted by the same reference characters. Their functions and names are also the same. Therefore, detailed description thereof will not be repeated. Though an electro-photographic type image forming apparatus (multifunction peripheral) will be described in the following, the present invention is not limited thereto, and the invention is applicable to any multifunction peripheral at least having a facsimile mode connectable to two or more lines on the transmitting side, and in the meaning that facsimile transmission is possible, the invention is applicable to any image communication apparatus. In the following description, expressions "facsimile", "fax" and "FAX" are used with no specific distinction between each other.

First Embodiment

An image forming apparatus (multifunction peripheral or communication apparatus) in accordance with the first embodiment of the present invention will be described in the following. The image forming apparatus is formed to include the image communication apparatus described above.

[Image Forming Apparatus]

Figure 2:
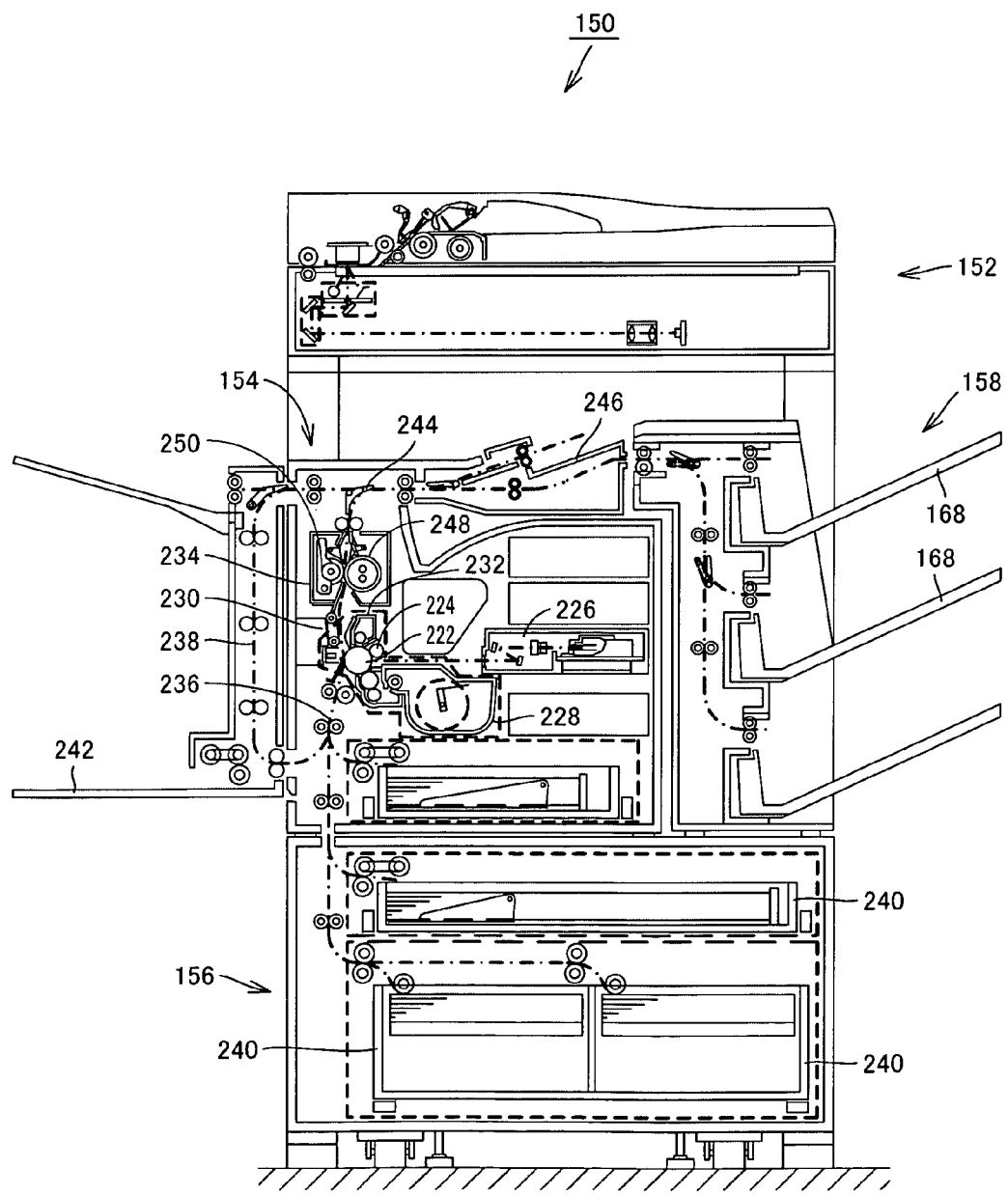
FIG. 2 shows, in a simplified manner, an internal structure of image forming apparatus 150 shown in FIG. 1.
Figure 3:
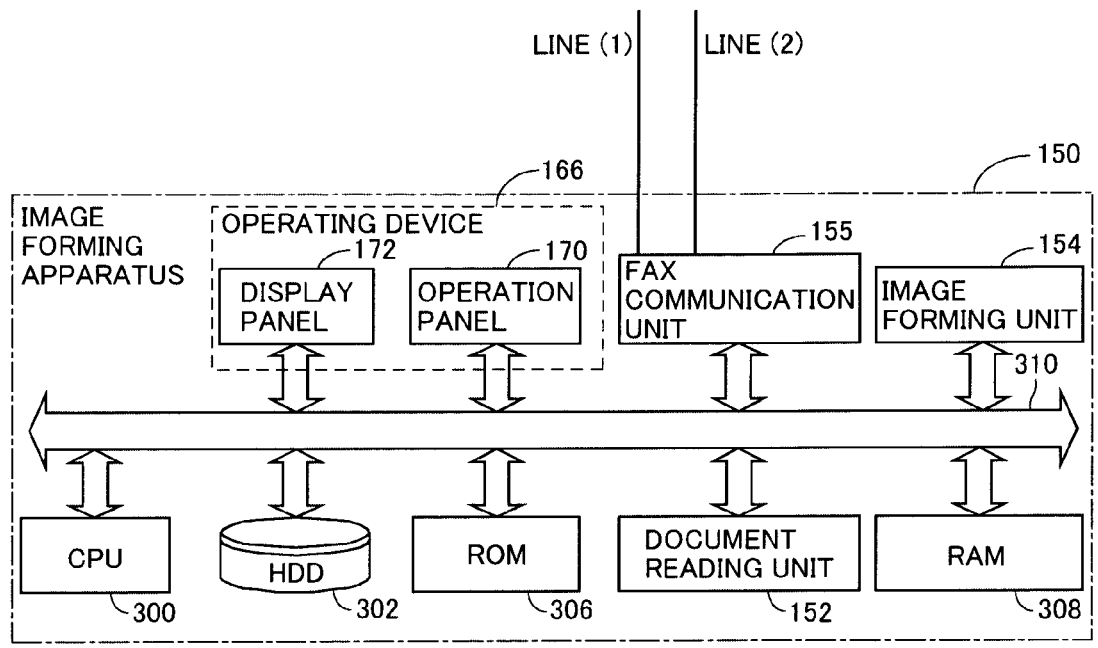
FIG. 3 is a functional block diagram showing hardware configuration of image forming apparatus 150 shown in FIG. 1.

FIG. 1 shows an appearance of image forming apparatus 150. FIG. 2 shows, in a simplified manner, the internal structure of image forming apparatus 150. FIG. 3 is a functional block diagram of image forming apparatus 150.

Referring to FIGS. 1 and 2, image forming apparatus 150 includes a document reading unit 152, an image forming unit 154, a paper feed unit 156 and a paper discharge unit 158.

Here, an operation in the facsimile mode will be described, as the description related to the internal structure of image forming apparatus 150.

—Transmission Operation—

In image forming apparatus 150, when a facsimile mode is designated and a start button is pressed, a document placed on a platen is read as image data by image reading unit 152, the read image data is input to a CPU (Central Processing Unit) 300 implemented by a microcomputer or the like shown in FIG. 3, where the image data is subjected to various image processing, and the image data is output to a FAX transmission unit (FAX communication unit 155 as will be described later).

FAX communication unit 155 of image forming apparatus 150 on a transmitting side connects a designated transmission side line to a designated transmission destination, converts the image data to communication data satisfying facsimile transmission standard, and transmits the converted data to a transmission side facsimile apparatus (for example, image forming apparatus 150 having the facsimile function).

—Communication Operation—

When the line is connected, FAX communication unit 155 of receiving side image forming apparatus 150 detects a communication request signal from FAX communication unit 155 of the transmitting side image forming apparatus 150, and transmits an acknowledgment signal. Thereafter, by way of example, FAX communication unit 155 exchanges performance information implemented on the transmitting and receiving sides, determines highest available communication speed, methods of image data coding/code correction, and sets communication method of a modem. Using image signal format in compliance with the communication method, the data is transmitted from FAX communication unit 155 of transmitting side image forming apparatus 150 to FAX communication unit 155 of receiving side image forming apparatus 150. After the end of transmission, the line is disconnected.

—Reception Operation—

FAX communication unit 155 of receiving side image forming apparatus 150 converts the received data to image data, and transmits it to image forming unit 154. The communication data may be converted to image data by image forming unit 154.

Image forming unit 154 is for printing the document image represented by the received image data on a sheet of recording paper, and it includes a photoreceptor drum 222, a charger 224, a laser scan unit (hereinafter referred to as an "LSU") 226, a developer 228, a transfer device 230, a cleaning device 232, a fixing device 234 and a neutralizing device, not shown.

Image forming unit 154 is provided with a main feeding path 236 and a reverse feeding path 238, and a sheet of recording paper fed from paper feed unit 156 is conveyed along main feeding path 236. Paper feed unit 156 picks up one by one the sheets of recording paper stacked in a paper cassette 240 or placed on a manual tray 242, and feeds the sheet to main feeding path 236 of image forming unit 154.

While the sheet of recording paper is conveyed along main feeding path 236 of image forming unit 154, the sheet of recording paper passes between photoreceptor drum 222 and transfer device 230 and further passes through fixing device 234, whereby printing is done on the sheet of recording paper.

Photoreceptor drum 222 rotates in one direction, and its surface is cleaned by cleaning device 232 and the neutralizing device and thereafter uniformly charged by charger 224.

LSU 226 modulates a laser beam based on the image data as the object of printing, and the laser beam scans the surface of photoreceptor drum 222 repeatedly in a main scanning direction, whereby an electrostatic latent image is formed on the surface of photoreceptor drum 222.

Developer 228 supplies toner to the surface of photoreceptor drum 222 to develop the electrostatic latent image, and thereby forms a toner image on the surface of photoreceptor drum 222.

Transfer device 230 transfers the toner image on the surface of photoreceptor drum 222 to the sheet of recording paper passing between the transfer device 230 and photoreceptor drum 222.

Fixing device 234 includes a heat roller 248 for heating the sheet of recording paper and a pressure roller 250 for pressing the sheet of recording paper. The sheet of recording paper is heated by heat roller 246 and pressed by pressure roller 250, whereby the toner image that has been transferred to the sheet of recording paper is fixed on the sheet.

At a position of connection between main feeding path 236 and reverse feeding path 238, a branch pawl 244 is provided.

When printing is to be done only on one side of the sheet of recording paper, branching pawl 244 is so positioned that the sheet of recording paper from fixing device 234 is guided by branching pawl 244 to discharge tray 246 or to paper discharge unit 158.

When printing is to be done on both sides of the sheet of recording paper, branching pawl 244 is turned to a prescribed direction so that the sheet of recording paper is guided to reverse feeding path 238. The sheet of recording paper passes through reverse feeding path 238 and fed again to main feeding path 236 with its side reversed, and while it is fed through main feeding path 236 again, printing is done on its rear surface. Then the sheet is guided to discharge tray 246 or to paper discharge unit 158.

As described above, the sheet of recording paper having the received image data printed thereon is guided to discharge tray 246 or to paper discharge unit 158 and discharged to discharge tray 246 or to any of discharge trays 168 of paper discharge unit 158.

[Hardware Block]

Referring to FIG. 3, image forming apparatus 150 further includes: an operating device 166 allowing setting of various functions related to communication and image forming processes; an ROM (Read Only Memory) 306 for storing a program and the like; an HDD (Hard Disk Drive) 302 as a non-volatile memory area capable of storing programs and data even when power is turned off, and an RAM (Random Access Memory) 308 providing a storage area when a program is executed.

Image forming apparatus 150 further includes: a bus 310 connected to document reading unit 152, image forming unit 154, FAX communication unit 155, operating device 166, ROM 306, HDD 302 and RAM 308; and CPU 300 connected to bus 310 for realizing general functions of the image forming apparatus.

ROM 306 stores programs and data necessary for controlling the operation of image forming apparatus 150. CPU 300 controls image forming apparatus 150, and executes control related to various functions of image forming apparatus 150, in accordance with the programs and data stored in ROM 306.

As shown in FIG. 3, at least two lines are connected for transmission and reception of image data, to FAX communication unit 155 of image forming apparatus 150. FAX communication unit 155 is capable of simultaneous FAX transmission/reception using line (1) and FAX transmission/reception using line (2). It is noted that two lines are not limiting, and the present invention is applicable if two or more lines are connected.

RAM 308 provides a function of a working memory for temporarily storing results of operations and processes by CPU 300, and a function of a frame memory for storing image data.

Document reading unit 152, image forming unit 154, a plate-shaped operation panel 170 and a display panel 172 of operating device 166, and ROM 306, HDD 302, and RAM 308 are controlled by CPU 300 executing a prescribed program.

Operating device 166 includes: plate-shaped operation panel 170 having ten-keys and hard keys as other various operation buttons arranged on a right side area of a surface of operating device 166; and display panel 172 formed of a small-sized touch-panel liquid crystal display device arranged on a central to left side area of operating device 166. Operation panel 170 and display panel 172 are held in one housing and operating device 166 is formed to be an integral body as a whole.

On display panel 172 of operating device 166, a state of image forming apparatus 150, an address designation status, a job processing status and the like are displayed. On the display area of liquid crystal display device of display panel 172, select buttons are displayed and when the user presses an area where the select buttons are displayed, the touch panel detects the pressed position. The display positions of select buttons and the pressed position of the touch-panel are compared on a program, whereby functions and operations of image forming apparatus 150 can be set and instructed.

In image forming apparatus 150, information related to the transmission destination to which a facsimile is to be transmitted (address name, address facsimile number) and the line to be used for the facsimile transmission can be registered in advance, and the transmission destination can be designated by a single-touch dial or an abbreviated dial. For this purpose, in HDD 302 or RAM 308, a single-touch designation table having such fields as shown in FIG. 4 is stored.

The single-touch designation table is formed to include at least an address name field, an address FAX number field, and a transmission line field, with a call number serving as a key. The transmission line field stores a line to be used when the corresponding address is designated. Specifically, either "line (1)" or "line (2)" or "not selected" is stored.

In FIG. 4, the call number is designated by a three-digit number. When the address is designated by pressing the three-digit number by ten-keys, the three-digit number functions as an abbreviated dial. When the three-digit number and an address name displayed on display panel 172 are related to each other and the address is designated by pressing the address name displayed on the touch panel, it functions as a single-touch dial. The abbreviated dial and the single-touch dial are not limited to the above. Further, a difference or differences between the abbreviated dial and the single-touch dial are not directly related to the characteristic part of the present invention. Therefore, it is assumed here that the abbreviated dial is not specifically different from the single-touch dial, unless clear distinction between the abbreviated dial and the single-touch dial is desired.

Image forming apparatus 150 in accordance with the present embodiment has a function of performing transmission taking into account the status of the transmission line at the time of transmission and/or the sender's demand related to the transmission line here, an arbitrary time point after the storage to the single-touch designation table, for example, at the time of designating the transmission address or at the time of giving transmission instruction), even if the transmission line for the address stored in single-touch designation table and actually designated as the transmission destination is set to "not selected." In order to realize such a function, image forming apparatus 150 executes a program having the following software configuration.

[Software Configuration]

Figure 5:
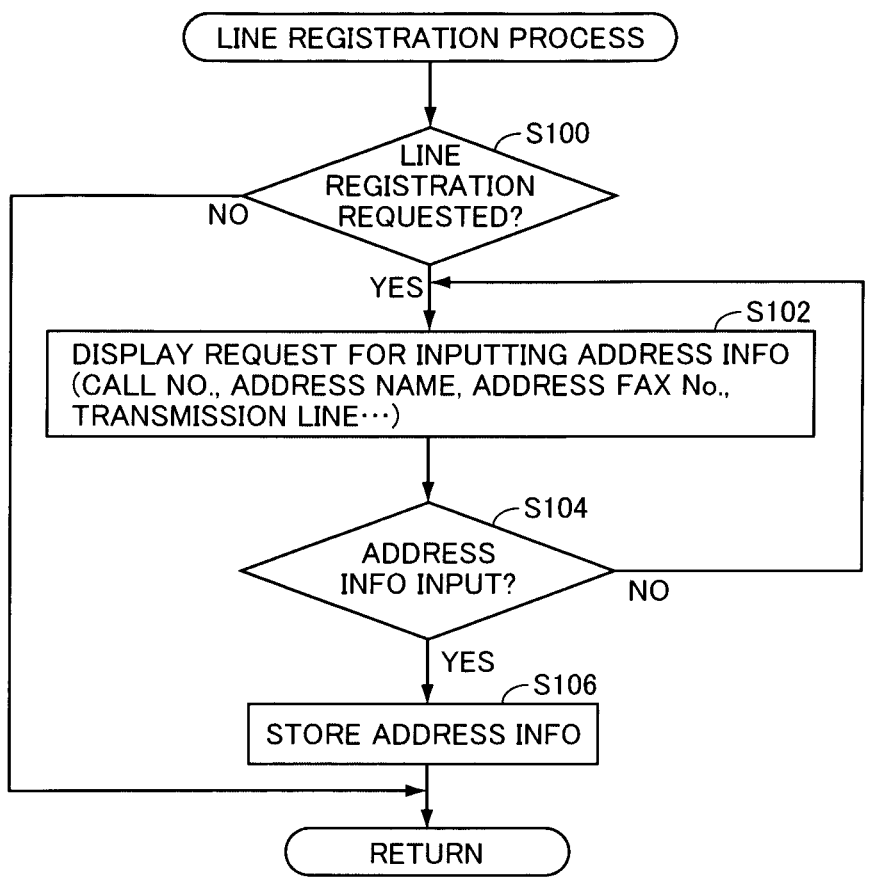
FIG. 5 is a flowchart representing a control structure of a registration program executed by the image forming apparatus in accordance with the first embodiment of the present invention.
Figure 6:
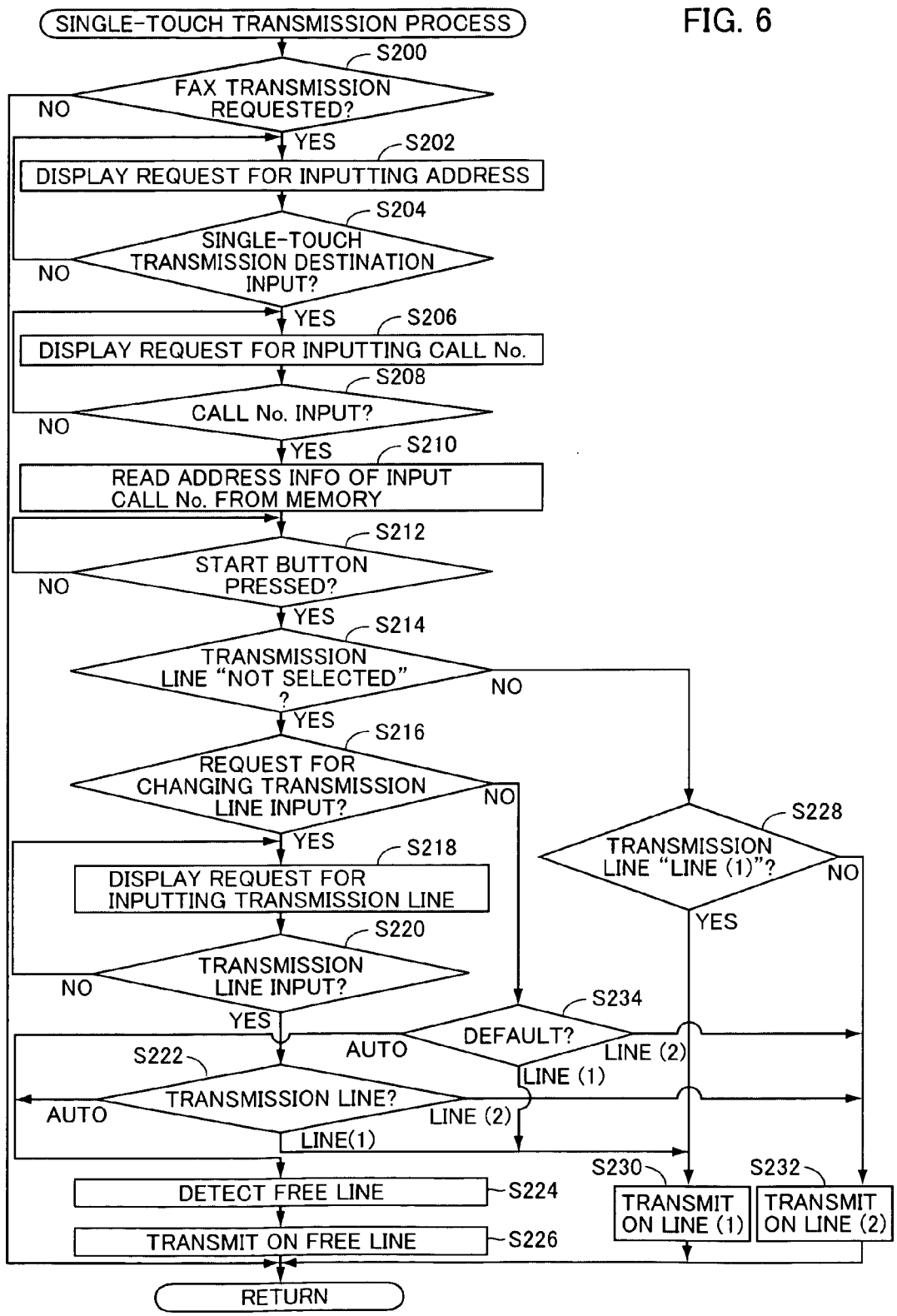
FIG. 6 is a flowchart representing a control structure of a transmission program executed by the image forming apparatus in accordance with the first embodiment of the present invention.

FIGS. 5 and 6 are flowcharts representing control structures of a line registration program and a single-touch transmission program, executed by image forming apparatus 150. CPU 300 of image forming apparatus 150 executes, in parallel with such a program, a program for realizing general functions of a computer or an image forming apparatus. The program, however, is not directly related to the characteristic part of the present invention and, therefore, details thereof will not be described here.

Referring to FIG. 5, at step (hereinafter "step" will be denoted by "S") 100, CPU 300 of image forming apparatus 150 (hereinafter simply referred to as CPU 300) determines whether or not a line registration request related to an abbreviation dial or a single-touch dial is input. Here, CPU 300 determines, based on information input by a user (sender) through the touch-panel of display panel 172, whether or not the line registration request is input. If it is determined that the line registration request has been input (YES at S100), the process proceeds to step S102. Otherwise (NO at S100), the process ends.

At S102, CPU 300 displays a request for inputting address information (at least a call number, an address name, an address FAX number and a transmission line (line information)), on display panel 172. A free number may appropriately be set as the call number and, in that case, a request for inputting the call number is not displayed.

At S104, CPU 300 determines whether or not the address information has been input. If it is determined that the address information has been input (YES at S104), the process proceeds to S106. Otherwise (NO at S104), the process is returned to S102.

At S106, CPU 300 stores the input address information in a non-volatile memory (here, HDD 302), in a data storage format shown in FIG. 4. If additional address information is to be input, the process is returned to S102.

Referring to FIG. 6, at S200, CPU 300 determines whether or not a FAX transmission request is input. Here, CPU 300 determines that the FAX transmission request is input if a tag portion of "FAX/IMAGE TRANSMISSION" displayed on the touch panel of display panel 172 is pressed. If it is determined that a FAX transmission request is input (YES at S200), the process proceeds to S202. Otherwise (NO at S200), the process ends.

At S202, CPU 300 displays a request asking the sender to input an address as the facsimile transmission destination, on display panel 172. At S204, CPU 300 determines whether or not there has been an input to designate a facsimile transmission destination from the single-touch transmission destinations. If there is an input designating a facsimile transmission destination from among the single-touch transmission destinations (YES at S204), the process proceeds to S206. Otherwise (NO at S204), the process is returned to S202, and the control waits until an input is made to designate a facsimile transmission destination from among the single-touch transmission destinations. As regards the input of address as the facsimile transmission destination, in the present embodiment, the input is limited to the single-touch transmission destinations of which address information is registered in advance, and hence, if it is NO at S204, the process is returned to S202. It is also possible to have the address FAX number as the facsimile transmission destination input every time if it is NO at S204, as in the second embodiment described later.

At S206, CPU 300 displays a request asking the sender to input a call number of the address as the facsimile transmission destination, on display panel 172. At S208, CPU 300 determines whether or not a call number stored in the single-touch designation table shown in FIG. 4 has been input. At S208, CPU 300 determines whether or not a call number registered in the single-touch designation table as a single-touch transmission destination is input. If the call number is input (YES at S208), the process proceeds to S210. Otherwise (NO at S208), the process is returned to S206, and the control waits for an input of the call number. It is also possible to have a plurality of addresses as single-touch transmission destinations displayed on display panel 172 (touch panel), and the call number may be input by the user pressing an input button corresponding to the displayed position.

At S210, CPU 300 reads the address information (at least the address name, address FAX number and transmission line) corresponding to the input call number from the memory.

At S212, CPU 300 determines whether or not a start button positioned on operation panel 170 is pressed. If the start button is pressed (YES at S212), the process proceeds to S214. Otherwise (NO at S212), the process is returned to step S212 and the control waits until the start button is pressed.

At S214, CPU 300 determines whether or not "transmission line" of the address information read from the memory is "not selected." If the "transmission line" is determined to be "not selected" (YES at S214), the process proceeds to S216. Otherwise (NO at S214), the process proceed to S218.

At S216, CPU 300 determines whether or not a request to change the transmission line as a sender's request is input. If a request for changing the transmission line is input (YES at S216), the process proceeds to S218. Otherwise (NO at S216), the process proceeds to S234.

At S218, CPU 300 displays a request asking the sender to input the transmission line on display panel 172. At S220, CPU 300 determines whether or not the transmission line is input. If the transmission line is input (YES at S220), the process proceeds to S222. Otherwise (NO at S220), the process is returned to S218, and the control waits for an input of the transmission line. It is possible to set the operation such that transmission is done using a default transmission line, which will be described later, if the transmission line is not input after a prescribed time period.

At S222, CPU 300 determines whether the input transmission line is "auto," "line (1)" or "line (2)." If the input transmission line is "auto" ("AUTO" at S222), the process proceeds to S224, if the input transmission line is "line (1)" ("LINE (1)" at S222), the process proceeds to S230, and if the input transmission line is "line (2)" ("LINE (2)" at S222), the process proceeds to S232.

At S224, CPU 300 detects a free line. At S226, CPU 300 transmits FAX using the free line. Then, the process ends.

At S228, CPU 300 determines whether or not "transmission line" of the address information read from the memory is "line (1)". If "transmission line" is determined to be "line (1)" (YES at S228), the process proceeds to S230. Otherwise (NO at S228), the process proceeds to S232.

At S230, CPU 300 transmits FAX using "line (1)". Then, the process ends. At S232, CPU 300 transmits FAX using "line (2)". Then, the process ends.

At S234, CPU 300 determines whether the default line is "auto", "line (1)" or "line (2)". If the default line is "auto" ("AUTO" at S234), the process proceeds to S224, if the input transmission line is "line (1)" ("LINE (1)" at S234), the process proceeds to S230, and if the input transmission line is "line (2)" ("LINE (2)" at S234), the process proceeds to S232.

[Operation]

The operation of image forming apparatus 150 in accordance with the present embodiment based on the structure and flowcharts as above will be described with reference to FIGS. 7 to 11.

—Line Registration Operation—

When a sender or an administrator of image forming apparatus 150 presses a line registration requesting button displayed, for example, on display panel 172 (touch panel), it is determined that a line registration request is input (YES at S100).

Figure 7:
Figure 8:
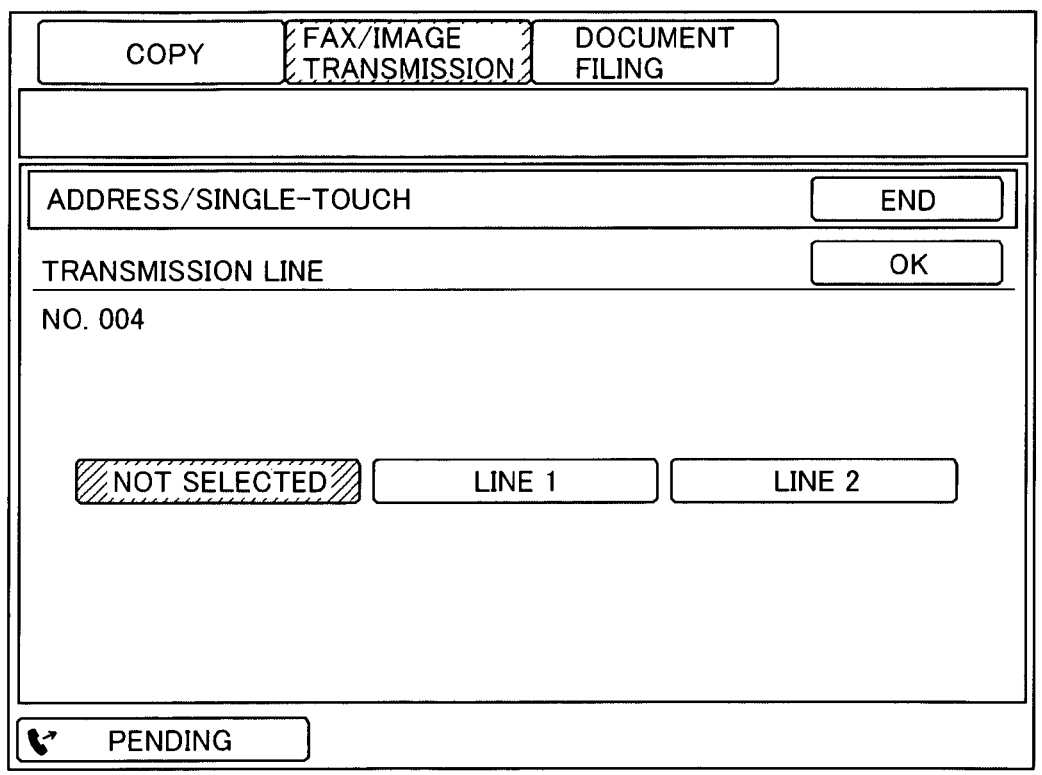

Then, a window shown in FIG. 7 is displayed on display panel 172 (S102). In FIG. 7, a call number is displayed as "SEARCH No." When "TRANSMISSION LINE" button of FIG. 7 is pressed, a window shown in FIG. 8 is displayed on display panel 172. At this time, one of "NOT SELECTED", "LINE 1 (=line (1))" and "LINE 2 (=line (2))" can be selected. In FIG. 8, a default state is displayed, in which "NOT SELECTED" is selected and highlighted.

If any one shown in FIG. 8 is selected and "OK" button is pressed, the display is returned to the window of FIG. 7. If the sender or the administrator of image forming apparatus 150 inputs all necessary pieces of address information and presses "END" button, it is determined that the address information is input (YES at S104).

The input address information is stored in the memory (S106). Such operations are repeated and the single-touch designation table shown in FIG. 4 is formed.

—Single-Touch Transmission Operation—

When the sender places a document to be transmitted on the platen and presses a tag portion of "FAX/IMAGE TRANSMISSION" displayed on the touch panel of display panel 172, it is determined that a FAX transmission request is input (YES at S200). At this time point, the document to be transmitted is read by document reading unit 152. The document to be transmitted may be read at the time point when the start button, as will be described later, is pressed.

A request asking the sender to input the address as the facsimile transmission destination is displayed on display panel 172 (S202), designation of facsimile transmission destination from single-touch transmission destinations is input (YES at S204), and a request asking the sender to input the call number of the address as the facsimile transmission destination is displayed on display panel 172 (S206).

If the call number among the single-touch transmission destinations is input (YES at S208), the address information (at least the address name, address FAX number and transmission line) corresponding to the input call number is read from the memory (S210).

If the sender presses the start button positioned on operation panel 170 (YES at S212) and the transmission line of address information read from the memory is "line (1)" (NO at S214 and "LINE (1)" at S228), the document is transmitted using line (1) (S230), and if the transmission line is "line (2)" (NO at S214 and "LINE (2)" at S228), the document is transmitted using line (2) (S232). At this time, if the designated line is not busy, the document is transmitted immediately. If the designated line is busy, control waits until the end of use and the document is transmitted after the line becomes available.

Figure 9:
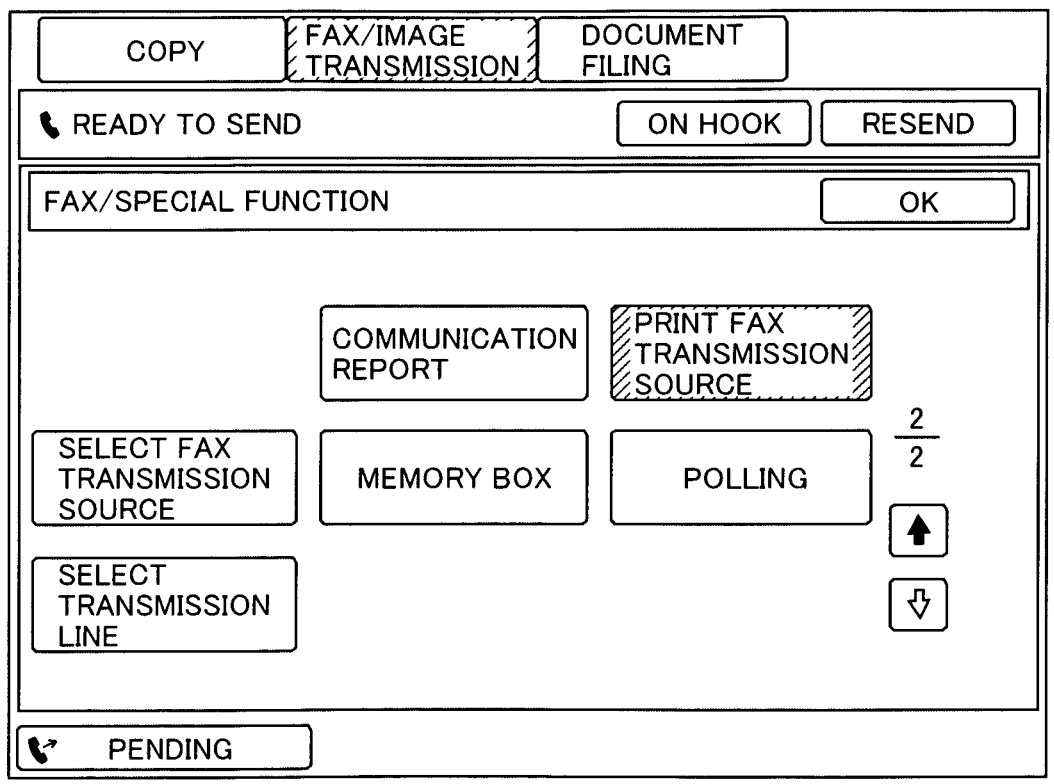

If the transmission line of address information read from the memory is "not selected" (YES at S214), a window shown in FIG. 9 is displayed on display panel 172, allowing an input of a request for changing the transmission line (S216). FIG. 9 shows a "SELECT TRANSMISSION LINE" button that can be pressed, and by pressing the "SELECT TRANSMISSION LINE" button, a request for changing the transmission line can be input. If the "SELECT TRANSMISSION LINE" button is pressed (YES at S216), a message of FIG. 10 is displayed for a prescribed time period, and thereafter, a window shown in FIG. 11 is displayed on display panel 172 (S218).

In the message of FIG. 10, "IF LINE IS DESIGNATED FOR SINGLE-TOUCH ADDRESS, DESIGNATED LINE IS GIVEN PRIORITY." may not be displayed. Depending on the default setting, the displayed message "IF UNCHANGED, LINE WILL BE DETERMINED BY DEFAULT AUTO SELECTION" may be changed to "IF UNCHANGED, LINE WILL BE DEFAULT LINE (1)" or "IF UNCHANGED, LINE WILL BE DEFAULT LINE (2)."

Figure 11:
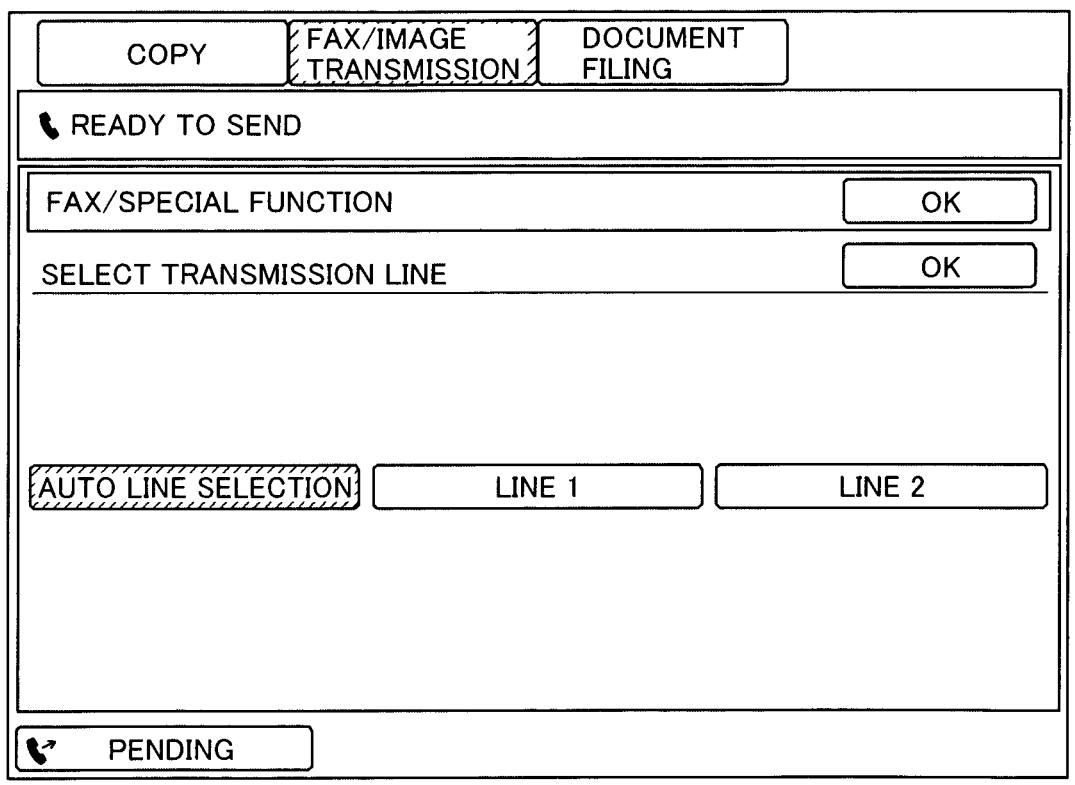

As shown in FIG. 11, one of "AUTO LINE SELECTION= ("auto"), "LINE 1 (=line (1))" and "LINE 2 (=line (2))" may be selected. In FIG. 11, "AUTO LINE SELECTION" as the default setting is selected and highlighted.

If any of the options shown in FIG. 11 is selected and thereafter "OK" button is pressed (YES at S220), the document is transmitted using line (1) (S230) if the input transmission line is "line (1)" ("LINE (1) at S222), the document is transmitted using line (2) (S232) if the input transmission line is "line (2)" ("LINE (2) at S222), and the document is transmitted by detecting a free line (S224) and using the free line (S226) if the input transmission line is "auto" ("AUTO" at S222). Two OK buttons shown in FIG. 11 may be each pressed once.

If the input transmission line is "line (1)" or "line (2)", the document is immediately transmitted if the designated line is not busy. If the designated line is busy, control waits until the end of use of the line, and the document is transmitted after the use ends and the line becomes free. If the input transmission line is "auto" and both lines (1) and (2) are free, transmission takes place immediately using either one of the two lines. If either one of lines (1) and (2) is busy, transmission takes place immediately using the line that is not busy. If both lines are busy, control waits until use of either one of the lines ends, and transmission takes place when either one of the lines becomes free.

As described above, by the image forming apparatus in accordance with the present embodiment, if a line to be used for transmission is to be specified (for example, to specify the communication expense), transmission can be done using the line regardless of the free status of the lines, and if earlier transmission is desired, transmission can be done using any free line. Specifically, assuming that FAX address is designated by a single-touch dial or abbreviated dial, (1) if "not selected" has been selected beforehand for the address and "auto line selection" is selected at the time of FAX transmission, document can be transmitted immediately using a free line and (2) even if "not selected" is set as in (1) above, if "line (1)" is selected at the time of FAX transmission, document can be transmitted using line (1), and if "line (2)" is selected, document can be transmitted using line (2).

As described above, even when the address name and address facsimile number as FAX address information and the line information of the line to be used therewith are registered in advance and the FAX transmission destination is designated by a single-touch dial or an abbreviated dial, it is possible to transmit taking into account the status of use of the communication line at the time of transmission as well as the user's demand on the communication line to be used (whether he/she wishes to transmit using a specific transmission line or to transmit faster regardless of the communication line used).

Second Embodiment

In the following, an image forming apparatus in accordance with a second embodiment of the present invention will be described. The image forming apparatus in accordance with the present embodiment executes a broadcast transmission program using a part of the single-touch transmission program shown in FIG. 6. The configuration of image forming apparatus in accordance with the present embodiment differs from the first embodiment only in the structure of the program executed by CPU 300. Therefore, the program structure will be described in the following.

[Software Configuration]

Figure 12:
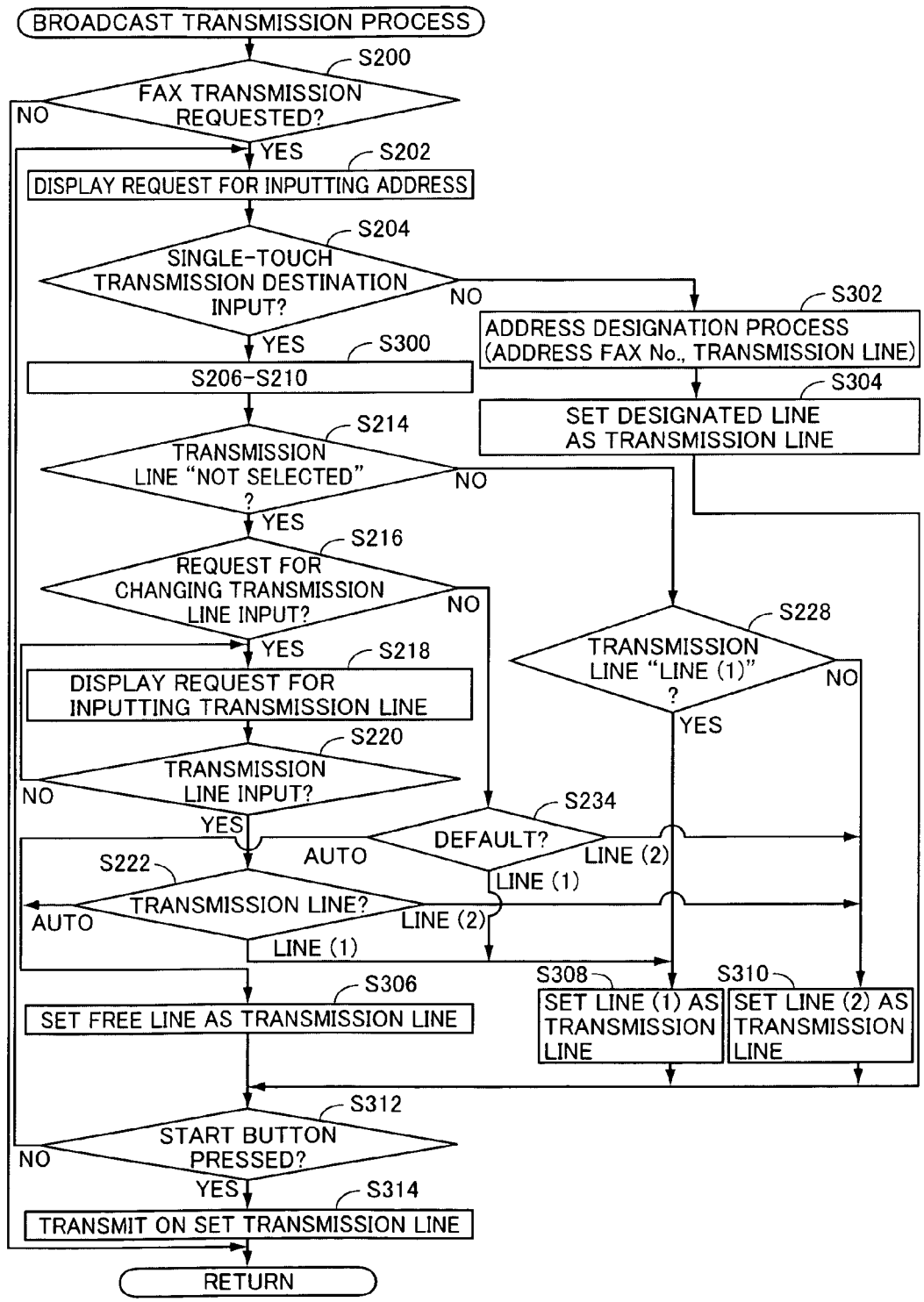
FIG. 12 is a flowchart representing a control structure of a broadcast transmission program executed by an image forming apparatus in accordance with a second embodiment of the present invention.

FIG. 12 is a flowchart showing a control structure of a program executed by CPU 300 of the image forming apparatus in accordance with the present embodiment. In the flowchart of FIG. 12, the same processes as those of the flowchart of FIG. 6 are denoted by the same step numbers.

If it is YES at S204 (if it is determined that a single-touch transmission destination is input), CPU 300 executes processes of steps S206 to S210, at S300.

If it is NO at S204 (if it is determined that a single-touch transmission destination is not input), CPU 300 executes an address designation process at S302. At S304, CPU 300 sets the designated line to be the transmission line. In this manner, the address FAX number as the FAX transmission destination and the transmission line are designated, as the address designation process. The transmission line designated at this time is any of "line (1)", "line (2)" and "auto".

At S306, CPU 300 sets a free line as the transmission line. Thereafter, the process proceeds to S312. At S308, CPU 300 sets line (1) to be the transmission line. Thereafter, the process proceeds to S312. At S310, CPU 300 sets line (2) to be the transmission line. Thereafter, the process proceeds to S312.

At S312, CPU 300 determines whether the start button positioned on operation panel 170 is pressed or not. If the start button is pressed (YES at S312), the process proceeds to S314. Otherwise (NO at S312), the process is returned to S202, and the next broadcast transmission destination is input. At S314, FAX transmission is done to the addresses designated for broadcast transmission, using the set transmission line. Then, the process ends.

[Operation]

The operation of image forming apparatus 150 in accordance with the present embodiment based on the structure and flowchart as above will be described in the following.

—Broadcast Transmission Operation—

When the sender places a document to be transmitted on the platen, presses a tag portion of "FAX/IMAGE TRANSMISSION" displayed on the touch panel of display panel 172, and it is determined that a FAX transmission request is input (YES at S200), a request asking the user to input an address as the facsimile transmission destination is displayed on display panel 172 (S202). Determination is made as to whether or not there has been an input to designate a facsimile transmission destination from the single-touch transmission destinations (S204).

(A) If there is an input to designate a facsimile transmission destination from the single-touch transmission destinations (YES at S204), processes of steps S206 to 210, 5214 to 5222, 5228 and S234 are executed, as described in the first embodiment.

(B) If there is no input to designate a facsimile transmission destination from the single-touch transmission destinations (NO at S204), the address designation process takes place, in which the address FAX number as the FAX transmission destination and the transmission line are designated (S302), and the designated line is used as the transmission line (S304).

When setting of broadcast FAX transmission destinations by single-touch dialing and setting of broadcast FAX transmission destination by individual input end, that is, when all settings related to the broadcast FAX transmission end, the sender presses the start button positioned on operation panel 170 (YES at S312).

For each address of broadcast FAX transmission, the document is transmitted using a free line if the set transmission line is "free line" (S306, S314), the document is transmitted using line (1) if the set transmission line is "line (1)" (S308, S314), and the document is transmitted using line (2) if the set transmission line is "line (2)" (S310, S314).

Here, if the set line is not busy, transmission takes place immediately. If the designated line is busy, however, control waits until the use ends, and transmission takes place when the line becomes free. At this time, if the set transmission line is "auto" (that is, free line), transmission takes place immediately using either of line (1) and (2) if both lines are free, transmission takes place immediately using the line that is not busy if either one of line (1) and (2) is busy, and if both lines are busy, control waits until use of either one of the lines ends, and if either of the lines becomes free, transmission takes place using the free line.

As described above, even when the address name and address facsimile number as FAX address information and the line information of the line to be used therewith are registered in advance and the FAX transmission destinations for broadcast transmission are designated by single-touch dials or abbreviated dials, or if the address FAX numbers are designated by individual input, it is possible to transmit taking into account the status of use of the communication line at the time of broadcast transmission as well as the user's demand on the communication line to be used (whether he/she wishes to transmit using a specific transmission line or to transmit faster regardless of the communication line used).

In the second embodiment described above, if the address of "not selected" is selected while a plurality of FAX addresses are designated, the transmission line is designated. It is also possible to determine whether there is any FAX address of which transmission line is set to "not selected", and if there is any address of "not selected," to display a window for designating a transmission line, when execution of transmission is instructed (after designating a plurality of FAX addresses, rather than when FAX addresses are being designated).

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image communication apparatus, connected to a plurality of communication lines, for transmitting image data using any of said plurality of communication lines, comprising:
   a storage unit for storing, in a mutually associated manner, in advance identification information for a user to identify a transmission destination, transmission destination information for specifying a transmission destination for transmitting said image data using said communication line, and line information, in including a piece of information for specifying the communication line to be used for transmission or a piece of information indicating that the communication line to be used for transmission is not specified, among said plurality of communication lines;
   an input unit for the user to input the identification information;
   a call unit calling said transmission destination information and said line information, based on the identification information input by the user;
   a display input unit for receiving a user input, if it is determined that the communication line to be used for transmission is not specified by said called line information, of a communication line to be used for transmitting said image data among said plurality of communication lines; and
   a transmission unit transmitting the image data to said transmission destination based on said called transmission destination information and said line information; wherein said transmission unit includes a unit for transmitting, if it is determined that the communication line to be used for transmission is specified by said called line information, the image data using the communication line specified by said called line information, and a unit for transmitting, if it is determined that the communication line to be used for transmission is not specified by said called line information, the image data using a communication line input by the user at the time of transmission of the image data;
   a broadcasting unit for setting a communication line for transmitting the image data to a plurality of transmission destinations; wherein said broadcasting unit includes a unit for setting, if it is determined that a communication line to be used for transmission is specified by said called line information, to use the specified communication line, a unit for setting, if it is determined that a communication line to be used for transmission is not specified by said called line information, to use a communication line input by the user at the time of image data transmission, and a unit for controlling said transmission unit such that the image data is transmitted using said set communication line.

2. The image communication apparatus according to claim 1, wherein
   the time when a communication line is input by said user is after said transmission destination information and said line information are stored in said storage unit.

3. The image communication apparatus according to claim 2, wherein
   the time when a communication line is input by said user is when the user requests execution of image transmission.

4. The image communication apparatus according to claim 2, wherein
   the time when a communication line is input by said user is when the user designates a transmission destination of the image.

5. The image communication apparatus according to claim 1, wherein
   said line information includes information that the line is one not used among said plurality of communication lines.

6. An image forming apparatus comprising the image communication apparatus according to claim 1.

7. The image communication apparatus according to claim 1, wherein
   said display input unit includes a unit formed of a touch-panel, allowing input of said line information by the user pressing an input button corresponding to a display position related to said plurality of communication lines, when the image data is transmitted.

8. The image communication apparatus according to claim 7, wherein
   the time when a communication line is input by said user is after said transmission destination information and said line information are stored in said storage unit.

9. The image communication apparatus according to claim 8, wherein
   the time when a communication line is input by said user is when the user requests execution of image transmission.

10. The image communication apparatus according to claim 8, wherein
    the time when a communication line is input by said user is when the user designates a transmission destination of the image.

11. The image communication apparatus according to claim 7, wherein
    said line information includes information that the line is one not used among said plurality of communication lines.

12. An image forming apparatus comprising the image communication apparatus according to claim 7.

13. The image communication apparatus according to claim 1, wherein the time when a communication line is input by said user is after said transmission destination information and said line information are stored in said storage unit.

14. The image communication apparatus according to claim 13, wherein
the time when a communication line is input by said user is when the user requests execution of image transmission.

15. The image communication apparatus according to claim 13, wherein
the time when a communication line is input by said user is when the user designates a transmission destination of the image.

16. The image communication apparatus according to claim 1, wherein said line information includes information that the line is one not used among said plurality of communication lines.

17. An image forming apparatus comprising the image communication apparatus according to claim 1.

* * * * *